United States Patent
Zhu

(10) Patent No.: US 11,124,625 B2
(45) Date of Patent: Sep. 21, 2021

(54) POLYMER COMPOSITES OF HIGH DIELECTRIC CONSTANT AND LOW DIELECTRIC DISSIPATION

(71) Applicant: Dow Silicones Corporation, Midland, MI (US)

(72) Inventor: Bizhong Zhu, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 149 days.

(21) Appl. No.: 16/487,133

(22) PCT Filed: Apr. 18, 2018

(86) PCT No.: PCT/US2018/028088
§ 371 (c)(1),
(2) Date: Aug. 20, 2019

(87) PCT Pub. No.: WO2018/208446
PCT Pub. Date: Nov. 15, 2018

(65) Prior Publication Data
US 2020/0291202 A1  Sep. 17, 2020

Related U.S. Application Data

(60) Provisional application No. 62/505,270, filed on May 12, 2017.

(51) Int. Cl.
| | |
|---|---|
| *C08K 3/36* | (2006.01) |
| *C08K 3/11* | (2018.01) |
| *C08K 3/08* | (2006.01) |
| *C08K 3/22* | (2006.01) |

(52) U.S. Cl.
CPC .................. *C08K 3/36* (2013.01); *C08K 3/08* (2013.01); *C08K 3/11* (2018.01); *C08K 3/22* (2013.01); *C08K 2003/0806* (2013.01); *C08K 2003/2231* (2013.01); *C08K 2003/2237* (2013.01); *C08K 2201/011* (2013.01)

(58) Field of Classification Search
None
See application file for complete search history.

(56) References Cited

U.S. PATENT DOCUMENTS

| | | |
|---|---|---|
| 8,143,337 B1 | 3/2012 | Lee et al. |
| 2009/0294736 A1 | 12/2009 | Burton et al. |
| 2017/0081499 A1 | 3/2017 | Hotta et al. |
| 2018/0331270 A1* | 11/2018 | Tehrani .................. C08K 3/041 |

FOREIGN PATENT DOCUMENTS

| | | | |
|---|---|---|---|
| EP | 1600469 | | 11/2005 |
| EP | 1749853 | | 2/2007 |
| EP | 3 270 386 | * | 1/2018 |
| WO | 2005117170 | | 12/2005 |
| WO | 2011136440 | | 11/2011 |

OTHER PUBLICATIONS

Guha et al. (Effects of Silica Nanoparticle Surface Treatment and Average Diameter on the Physical and Mechanical Properties of Poly(dimethylsiloxane)-Silica Nanocomposites) (Year: 2010).*
Sigma Aldrich datasheet for carbon nanotubes. (Year: 2021).*
Saifuddin et al (J. of Chemistry 2013, ID 676815, p. 1-18). (Year: 2013).*
Y. Liu et al., Dielectric elastomer film actuators: characterization, experiment and analysis; Smart Mater. Struct 18, IOP Publishing; Jul. 17, 2009.

* cited by examiner

*Primary Examiner* — Robert T Butcher

(57) ABSTRACT

A composition comprising: a) electrically conductive fibers comprising carbon, a conductive oxide, or a metal; and having an average diameter from 1 to 20,000 nm and an average length at least five times the average diameter; and b) electrically nonconductive particles with an average diameter from 1 to 20,000 nm.

3 Claims, No Drawings

POLYMER COMPOSITES OF HIGH DIELECTRIC CONSTANT AND LOW DIELECTRIC DISSIPATION

CROSS REFERENCE TO RELATED APPLICATIONS

This application is a U.S. national stage filing under 35 U.S.C. § 371 of PCT Application No. PCT/US18/028088 filed on 7 Jan. 2016, which claims the benefit of U.S. Provisional Patent Application No. 62/505,270 filed 12 May 2017 under 35 U.S.C. § 119 (e). PCT Application No. PCT/US18/028088 and U.S. Provisional Patent Application No. 62/505,270 are hereby incorporated by reference.

This invention relates to a polymer composite comprising fibrous and particulate fillers, particularly a polymer composite comprising fibrous electrically conductive fillers and electrically nonconductive particulate fillers, which is useful in electro-actuation applications. It further relates to a method of incorporating fibrous fillers into a polymeric matrix.

In addition to electro-actuation, there are many other applications where it is desired to increase the dielectric constant of a polymer. Many techniques have been applied for this purpose, including chemical modification of the main chain and side groups, and incorporation of high dielectric constant fillers. A common drawback of increasing dielectric constant is the concurrent increase in dielectric loss. An increase in dielectric loss can cause higher energy consumption, heat generation during the operation of the devices, signal delay, and increase leakage current. Silicone films have been filled with barium titanate to provide a dielectric film actuator, see for example, Y. Liu et al., *Smart Mater. Struct.*, 18 (2009) 095024. However, this reference discloses an increase in dielectric loss with increasing amounts of barium titanate.

There is an unsolved problem to fully utilize those approaches to increase the dielectric constant but with innovative techniques to suppress the increase of dielectric loss. Further, the increase in elastic modulus should be minimized.

Statement of the Invention

The present invention provides a composition comprising:

a) electrically conductive fibers comprising carbon, a conductive oxide, or a metal; and having an average diameter from 1 to 20,000 nm and an average length at least five times the average diameter; and b) electrically nonconductive particles with an average diameter from 1 to 20,000 nm.

The present invention also provides a method comprising:

c) creating a surface electric charge on a fibrous material by physical adsorption or chemical oxidation d) adding a particulate material bearing opposite charge on the surface to form a mixture, and e) combining the mixture with a polymer.

DETAILED DESCRIPTION

Percentages are weight percentages (wt %) and temperatures are in ° C. unless specified otherwise. Operations were performed at room temperature unless specified otherwise. As used herein, unless otherwise indicated, molecular weights, $M_n$, $M_w$ and $M_z$ have the conventional meanings and are determined by gel permeation chromatography. Molecular weights are reported herein in units of g/mol. Silanol index is determined by FT-IR as described in the Examples.

Preferably, the composition further comprises a polymer matrix, preferably one comprising a polysiloxane. Preferably, the polysiloxane is produced from a curable silicone composition selected from (a) hydrosilylation-curable silicone compositions; (b) condensation-curable silicone compositions; (c) thiol-ene reaction-curable silicone compositions; (d) free-radical-curable silicone compositions; and (e) ring-opening reaction curable silicone compositions. Each of the foregoing may be cured using means other than those stated or by a combination of means.

A hydrosilylation-curable silicone composition typically comprises: (A) an organopolysiloxane having an average of at least two silicon-bonded alkenyl groups or silicon-bonded hydrogen atoms per molecule; (B) an organosilicon compound having an average of at least two silicon-bonded hydrogen atoms or silicon-bonded alkenyl groups per molecule capable of reacting with the silicon-bonded alkenyl groups or silicon-bonded hydrogen atoms in the organopolysiloxane (A); and (C) a hydrosilylation catalyst. The organopolysiloxane (A) and the organosilicon compound (B) may independently be linear, branched, cyclic, or resinous. In particular, the organopolysiloxane (A) and the organosilicon compound (B) may comprise any combination of M, D, T, and Q units. M represents the monofunctional unit $R^0{}_3SiO_{1/2}$. D represents the difunctional unit $R^0{}_2SiO_{2/2}$. T represents the trifunctional unit $R^0SiO_{3/2}$. Q represents the tetrafunctional unit $SiO_{4/2}$. Each $R^0$ may be any hydrocarbon, aromatic, aliphatic, alkyl, alkenyl, or alkynyl group. An organopolysiloxane comprising repeating D units is substantially linear but may include some branching attributable to T and/or Q units. When organopolysiloxanes are predominantly linear the resulting structures are elastomeric. In a preferred embodiment, the organopolysiloxane (A) has the general formula:

$$(R^1R^2{}_2SiO_{1/2})_w(R^2{}_2SiO_{2/2})_x(R^2SiO_{3/2})_y(SiO_{4/2})_z \qquad (I)$$

wherein each $R^1$ is an independently selected hydrocarbyl group, which may be substituted or unsubstituted and may include heteroatoms within the hydrocarbyl group (e.g., O, N, S), and each $R^2$ is independently selected from IV and an alkenyl group, with the proviso that at least two of $R^2$ are alkenyl groups, and w, x, y, and z are mole fractions such that $w+x+y+z=1$. For linear organopolysiloxanes, subscripts y and z are generally 0, whereas for resins, subscripts y and/or $z>0$. Preferably, the subscript w has a value of from 0 to 0.9, preferably from 0 to 0.6, preferably from 0 to 0.3, preferably from 0 to 0.1, preferably from 0.00001 to 0.001. Preferably, the subscript x has a value of from 0 to 0.99999, preferably from 0 to 0.9999, preferably from 0 to 0.999, preferably from 0 to 0.99, preferably from 0.9 to 0.99999, preferably from 0.9 to 0.9999, preferably from 0.9 to 0.999. The subscript y preferably has a value of from 0 to 0.99, preferably from 0 to 0.45, preferably from 0 to 0.25, preferably from 0.25 to 0.8, preferably from 0.5 to 0.8. The subscript z preferably has a value of from 0 to 0.99, preferably from 0 to 0.85, preferably from 0.85 to 0.95, preferably from 0.6 to 0.85, preferably from 0.4 to 0.65, preferably from 0.2 to 0.5, preferably from 0.1 to 0.45, preferably from 0 to 0.5, preferably from 0 to 0.25, preferably from 0 to 0.15. Preferably, when $R^1$ is halogen-substituted, it is 3,3,3-trifluoropropyl, 3-chloropropyl, chlorophenyl, dichlorophenyl, 2,2,2-trifluoroethyl, 2,2,3,3-tetrafluoropropyl, or 2,2,3,3,4,4,5,5-octafluoropentyl. Preferably, $R^1$ is a $C_1$ to $C_{10}$ hydrocarbyl group; preferably alkyl, aryl or aralkyl. Preferably, alkenyl groups represented by $R^2$, which may be the same or different within the organopolysiloxane (A), have from 2 to 10 carbon atoms, preferably from 2 to 6 carbon atoms, preferably vinyl or allyl, preferably vinyl.

Preferably, at least one of the silicone compositions comprises a condensation-curable silicone composition which comprises (A') an organopolysiloxane having an average of at least two silicon-bonded hydroxyl or hydrolyzable groups per molecule; optionally (B') an organosilicon compound having an average of at least two silicon-bonded hydrogen atoms, hydroxyl groups, or hydrolyzable groups per molecule; and (C') a condensation catalyst. Preferably, the condensation catalyst (C') is any condensation catalyst typically used to promote condensation of silicon-bonded hydroxy (silanol) groups to form Si—O—Si linkages, preferably amines; or compounds of titanium, lead, tin, zinc, zirconium, and iron with carboxylic acids, alkyl, and alkoxide groups; preferably tin(II) and tin(IV) compounds such as tin dilaurate, tin dioctoate, dibutyltin dilaurate, dibutyltin diacetate, and tetrabutyl tin; and titanium compounds such as titanium tetrabutoxide.

Preferably, at least one of the silicone compositions comprises a free radical-curable silicone composition which typically comprises (A") an organopolysiloxane having an average of at least two silicon-bonded unsaturated groups and (C") a free radical initiator.

Preferably, at least one of the silicone compositions comprises a ring opening reaction-curable silicone composition which typically comprises (A''') an organopolysiloxane having at least two epoxy-substituted groups, silacyclobutane rings and/or benzocyclobutene rings, and (C''') a curing agent.

Preferably, at least one of the silicone compositions comprises a thiol-ene curable silicone composition which comprises: (A'''') an organopolysiloxane having an average of at least two silicon-bonded alkenyl groups or silicon-bonded mercapto-alkyl groups per molecule; (B'''') an organosilicon compound having an average of at least two silicon-bonded mercapto-alkyl groups or silicon-bonded alkenyl groups per molecule capable of reacting with the silicon-bonded alkenyl groups or silicon-bonded mercapto-alkyl groups in the organopolysiloxane (A''''); (C'''') a catalyst; and (D'''') an optional organic compound containing two or more mercapto groups. The catalyst (C'''') can be any catalyst suitable for catalyzing a reaction between the organopolysiloxane (A'''') and the organosilicon compound (B'''') and/or the organic compound (D''''). Typically, the catalyst (C'''') is selected from: i) a free radical catalyst; ii) a nucleophilic reagent; and iii) a combination of i) and ii). Suitable free radical catalysts for use as the catalyst (C'''') include photo-activated free radical catalysts, heat-activated free radical catalysts, room temperature free radical catalysts such as redox catalysts and alkylborane catalysts, and combinations thereof. Suitable nucleophilic reagents for use as the catalyst (C'''') include amines, phosphines, and combinations thereof.

Preferably, at least one of the silicone compositions comprises a silicon hydride-silanol reaction curable silicone composition which typically comprises: (A''''') an organopolysiloxane having an average of at least two silicon-bonded hydrogen atoms or at least two silicone bonded hydroxyl groups per molecule; (B''''') an organosilicon compound having an average of at least two silicon-bonded hydrogen atoms per molecule capable of reacting with the silicon-bonded hydrogen atoms or silicon-bonded hydroxyl groups in the organ-opolysiloxane (A'''''); (C''''') a catalyst; and (D''''') an optional active hydrogen containing compound. Typically, the catalyst (C''''') is selected from: i) a Group X metal-containing catalyst such as platinum; ii) a base such as metal hydroxide, amine, or phosphine; and iii) combinations thereof.

The polymer matrix is not limited to silicone. Other polymers are suitable also, including thermoplastic polymers such as polyolefins, polyethers, polyketones, polyesters, polyurethanes, polyimides, polyacrylates, and thermoset polymers such as epoxies, cyanate esters, polyimides, polyurethanes, etc.

Preferably, the electrically conductive fibers have a conductivity from 0.1 to $1 \times 10^8$ Siemens per meter (S/m), preferably from 1 to $1 \times 10^8$ S/m, preferably from 4 to $1 \times 10^8$ S/m, preferably from 10 to $1 \times 10^8$ S/m, preferably from 100 to $1 \times 10^8$ S/m, preferably from $1 \times 10^3$ to $1 \times 10^8$ S/m. Preferably, the fibers comprise carbon which is surface oxidized.

Preferably, the electrically nonconductive particles have an average diameter of at least 1 nm, preferably at least 5 nm, preferably at least 10 nm; preferably no more than 20,000 nm, preferably no more than 10,000 nm, preferably no more than 1,000 nm. Average diameter is determined as an arithmetic average and can be measured by many techniques, preferably transmission electron microscope followed by image analysis. Preferably, the nanoparticles are electrically non-conductive, i.e., they have an electrical conductivity no greater than 0.1 S/m, preferably no greater than $1 \times 10^{-2}$ S/m, preferably no greater than $1 \times 10^{-3}$ S/m. Preferably, the nanoparticles comprise an inorganic or organic polymeric composition. Inorganic particles include but are not limited to barium titanate and other oxide compositions of the perovskite structure, titanium dioxide, zirconium dioxide, silicon dioxide, and oxides, borides, nitrides, carbides and silicides of other metals such as hafnium, germanium, tin, lead, aluminum, gallium, indium, niobium, scandium, yttrium, vanadium, and lanthanide and actinide series elements such as erbium, and europium. Organic polymeric particles include but are not limited to polystyrene, polyacrylates, polyvinylchloride, acrylonitrile-butadiene-styrene terpolymer, polyvinylidene fluoride, Polytetrafluoroethylene, polyvinyl acetate, and various copolymers.

Preferably, the electrically conductive fibers have an average diameter of at least 2 nm, preferably at least 3 nm, preferably at least 5 nm, preferably at least 10 nm; preferably no more than 10,000 nm, preferably no more than 5,000 nm, preferably no more than 1,000 nm, preferably no more than 500 nm, preferably no more than 100 nm, preferably no more than 50 nm. Preferably, the electrically conductive fibers have an average length at least 8 times the diameter, preferably at least 10 times; preferably no more than 1,000, 000 times, preferably no more than 100,000 times.

Preferably, the weight ratio of nanoparticles to electrically conductive fibers is from 0.01:50 to 50:1, preferably from 0.1:10 to 10:1, preferably from 0.2:2 to 5:1. Preferably, when the composition comprises a polymer matrix, the total weight of the nanoparticles and the electrically conductive fibers is from 0.1 to 80 wt % of the total weight of polymer matrix, nanoparticles and electrically conductive fibers, preferably at least 0.5 wt %, preferably at least 1 wt %; preferably no more than 80 wt %, preferably no more than 60 wt %.

In the method of this invention, preferably the particles and fibers are combined with a polymer resin which is then cured.

Examples

TABLE 1

Raw materials used, suppliers, and descriptions

| Materials | Description |
|---|---|
| Sylgard 184 | Dow Corning Sylgard 184 elastomer is a two part product consisting of Part A, the base, and Part B, the curing catalyst. 1 part of catalyst is used to cure 10 parts of base. |
| 100 nm ITO | $In_2O_3/SnO_2$ dispersion in IPA, 30 wt %, <100 nm in size. Purchased from Sigma Aldrich, catalogue number 700460, CAS# 50926-11-9. |
| Ag 18 nm particles | From US Research Nanomaterials, Inc., 3302 Twig Leaf Ln, Houston, Texas. Stock#: US1038. |
| Pyrograf III carbon nanofiber | PR-19-XT-PS. It is purchased from Sigma Aldrich and is a vapor phase grown carbon nanofiber with an average diameter of ~150 nm and with a layer of CVD deposited carbon on the surface. The material is debulked to arrive at a more uniform density and the polyaromatic hydrocarbon on the surface is stripped pyrollitically. It is originally manufactured by Pyrograf Products, Inc., in Cedarville OH. |
| CNT | Multiwalled CNT (MWCNT) dispersion in Isopropanol, 3 wt % MWCNT. Purchased from US. Research Nanomaterials, Inc. |
| CNT-$TiO_2$ | From US Research Nanomaterials, Inc., 3302 Twig Leaf Ln, Houston, Texas. Stock # US 4893. CNTs have an outside diameter of >50 nm and an inside diameter of 5-15 nm, and a length of 5-20 μm. It was treated by a cationic surfactant (cetyl trimethyl ammonium bromide). $TiO_2$ is a Rutile nanoparticle, 100 nm ~300 nm in size and spherical in shape. By electrostatic interactions, $TiO_2$ rutile and CNTs through electrostatic adsorption self-assembly to form a uniform and stable complex. |
| $BaTiO_3$ nano powder | 99.5%, average size of 50 nm. Purchased from Inframat ® Advanced Materials. Product #5622ON-N2, lot IAM12084BT05N2. |
| Colloidal Silica | Nalco DVSZ-N002, ~34 wt. % silica dispersion in water, pH = 9.5, high purity (low metal content: Na content ~0.005%) ammonia stabilized, particle size is 12 nm, dry particle surface area 250 $m^2/g$. |

Preparation of Oxidized Carbon Nanofiber (CNF).

2.84 g of PYROGRAF III PR-19-XT-PS carbon nanofiber (vapor phase grown, average diameter ca. 150 nm, CVD deposited carbon on surface) was placed in a three necked round bottom flask equipped with a mechanical stirrer, a reflux condenser, and a thermometer. 90 g of 70 wt % $HNO_3$ was diluted with deionized water to a total volume of 250 ml to prepare a 1M $HNO_3$ solution and the solution was added into the flask. With stirring the temperature was raised to 105.1° C. and reflux was maintained for 110 hours. The content was then cooled down, filtered through a #1 filter paper. The cake left on top of the filter paper was washed with DI water eight times. 75% of the cake was dispersed in 20 g DI water to make a stable slurry. The solid content in this slurry was determined to be ~10 wt % based on a heat drying measurement. The rest of the cake was dried in a ventilated oven at 95° C. for 20 hours, then 120° C. for 1 hour.

Treatment and Dispersion of $BaTiO_3$ Nanoparticles 10 g of 50 nm $BaTiO_3$ dry particles were placed in a 40 ml glass vial, 20 g of DI water was added followed by 0.13 g of 34-37 wt % hydrochloric acid. The mixture was stirred by a magnetic bar at room temperature for 20 hours, then mixed by an IKA T18 Ultra Turrax rotor stator mixer at 20 k rpm for 60 seconds. The dispersion was to be used in the next step without further treatment.

Preparation of CNF with $BaTiO_3$ Adsorbed onto it (CNF@$BaTiO_3$)

Half the quantity of the above prepared CNF slurry was taken and 65 g of DI water was added into it. The mixture was shaken to make a stable dispersion. To ensure homogeneous mixing, the mixture was mixed by an IKA T18 Ultra Turrax rotor stator mixer at 20 k rpm for 60 seconds. While maintaining stirring by the rotor stator mixer, 10 g of the above prepared $BaTiO_3$ dispersion was added. Mixing continued for another 60 seconds, then the content was placed in a glass container and water was removed by placing the container with the top open in a ventilated oven at 95° C. for 20 hours, then 120° C. for 1 hour. 4.5 g of dry material was obtained, and was estimated to consist of 1 part by weight of treated CNF in ⅔ parts by weight of treated $BaTiO_3$.

Preparation of CNF with Silica Nanoparticles Adsorbed onto it (CNF@$SiO_2$)

8.62 g of the above treated CNF slurry was placed in a 40 ml glass vial and mixed with 8 g DI water. The mixture was mixed with an ultrasonic processor, model GEX 130, with a max power of 130 W, and a model CV18 vibration generator, and a ⅜" diameter stainless steel tip, at 90% amplitude for 3 minutes. 5 g of Nalco DVSZN002 colloidal silica was then added and mixed with the same ultrasonic processor and the same process parameters. The resulting dispersion was stable. It was then poured into a petri dish and placed in a ventilated oven to dry: 3° C./min to 95° C., 95° C./8 h, 1° C./min to 100° C., 100° C./1 h, 1° C./min to 115° C., 115° C./2 h. 2.2 g of solid material was obtained. The weight ratio of CNF to silica was estimated to be 1 to 2.32.

Preparation of ITO in SYLGARD 184 Silicone Elastomer

Appropriate amount of 100 nm ITO particle (average diameter, ca. 150 nm) dispersion in IPA was mixed with SYLGARD 184 base polymer in a single neck round bottom flask. The amount of the latter was calculated to arrive at the desired ITO/Silicone ratio. The mixture was placed on a rotary evaporator set at 80° C. and continuously decreasing vacuum to remove the IPA. Final pressure was 1 mm Hg. The mixture free of IPA was then cooled, SYLGARD 184 curing catalyst, in the amount of 1/10 of the weight of the starting SYLGARD 184 base, was added and mixed well for curing. The ITO amount was adjusted for different samples to arrive at the desired total ITO content in the final cured composition.

Preparation of Comparison Sample Disks for Dielectric Measurement 5 g of Sylgard 184 base and 0.5 g of Sylgard 184 curing catalyst were mixed in a 10 g capacity cup on a FlackTek mixer at 3500 rpm for 2 minutes. 2 g of the mixture is placed in a 2 inch diameter opening of a 0.8 mm thick spacer cut out from an aluminum plate lined by a Teflon sheet on a polished stainless steel plate (6"×6") underneath. An additional Teflon sheet is placed on the top and then covered by another polished stainless steel plate. The assembly is placed in a heated press at a temperature of 130° C. and under a force of 4000 lb. The assembly is kept under this condition for 30 minutes and then cooled with chilled water flowing through the press platens. The cured 2 inch diameter, 0.8 mm thick disks are collected and used for dielectric tests. The thickness of the spacer was changed to obtain samples of different thickness for testing.

Preparation of Comparison Sample Disks Containing ITO Particles for Dielectric Measurement The ITO containing Sylgard 184 base and catalyst mixture was used to make disks, following the same procedure described above.

Preparation of Comparison Sample Disks Containing Ag Nanoparticles for Dielectric Measurement An appropriate amount of 18 nm average diameter dry Ag nano particles was placed in a 10 g capacity dental mixer cup, then 5 g of Sylgard 184 base was weighed in. 10 3 mm diameter corrosion resistant stainless steel bearing balls are placed in the cup and the mixture was mixed on a FlackTec mixer at 3500 rpm for 2 minutes (1 minutes, wait for 5 minutes, then 1 minute, to minimize heating up). After cooling for 10 minutes, 0.5 g of Sylgard 184 curing agent was weighed in and mixed at 3500 rpm for 30 seconds. 2 g of the mixture was taken to make disks for dielectric measurement, following the same disk making procedures described above. The amount of Ag nanoparticles was adjusted to arrive at the desired Ag content in the disks.

Preparation of Comparison Sample Disks Containing Carbon Nanofiber for Dielectric Measurement The same procedure was used to prepare untreated Pyrograf III CNF containing disks as above, only using the untreated Pyrograf III CNF instead of Ag nanoparticles.

Preparation of Example Disks Containing MWCNT-$TiO_2$ for Dielectric Measurement The same procedure was used to prepare MWCNT (multi-walled carbon nanotube, inside diameter 5-15 nm, outside diameter>50 nm, length 5-20 microns)-$TiO_2$ containing disks as above, only using the MWCNT-$TiO_2$ instead of Ag nanoparticles or untreated Pyrograf III CNF.

Preparation of Example Disks Containing CNF@$BaTiO_3$ for Dielectric Measurement The same procedure was used to prepare CNF@$BaTiO_3$ containing disks as above, only using the above prepared CNF@$BaTiO_3$, instead of MWCNT-$TiO_2$, Ag nanoparticles, or untreated Pyrograf III CNF.

Preparation of Example Disks Containing CNF@$SiO_2$ for Dielectric Measurement

The same procedure was used to prepare CNF@$SiO_2$ containing disks as above, only using the above prepared CNF@ $SiO_2$, instead of MWCNT-$TiO_2$, Ag nanoparticles, or untreated Pyrograf III CNF.

TABLE 2

Sample compositions and Dielectric Test Results.

| Sample Description | Avg. Sample Thickness (mm) | Electrode Gap Reading (mm) | Frequency | Dielectric Constant | Dissipation Factor |
| --- | --- | --- | --- | --- | --- |
| Sylgard 184 1 mm | 0.971 | 1.0700 | 100 Hz | 2.74 | 0.0028 |
| Baseline Sample | 0.971 | 1.0700 | 100 kHz | 2.73 | 0.0014 |
|  | 0.971 | 1.0700 | 1 MHz | 2.73 | 0.0014 |
| Sylgard 184-0.4 mm | 0.408 | 0.4500 | 100 Hz | 2.64 | 0.0021 |
| Baseline Sample | 0.408 | 0.4500 | 100 kHz | 2.63 | 0.0011 |
|  | 0.408 | 0.4500 | 1 MHz | 2.63 | 0.0011 |
| Sylgard 184-1 mm, Repeat | 0.957 | 1.0700 | 100 Hz | 2.76 | 0.0032 |
| Sylgard 184 0.8 mm | 0.769 | 0.8500 | 100 Hz | 5.15 | 0.0048 |
| 15% ITO 100 nm round particles | 0.769 | 0.8500 | 100 kHz | 5.02 | 0.0068 |
| Comparison Sample | 0.769 | 0.8500 | 1 MHz | 4.95 | 0.0289 |
| Sylgard 184 0.8 mm | 0.742 | 0.8200 | 100 Hz | 4.99 | 0.0044 |
| 20% ITO 100 nm round particles | 0.742 | 0.8200 | 100 kHz | 4.87 | 0.0066 |
| Comparison Sample | 0.742 | 0.8200 | 1 MHz | 4.81 | 0.0281 |
| Sylgard 184 0.8 mm | 0.743 | 0.8200 | 100 Hz | 4.00 | 0.0034 |
| 10% ITO 100 nm round particles | 0.743 | 0.8200 | 100 kHz | 3.93 | 0.0073 |
| Comparison Sample | 0.743 | 0.8200 | 1 MHz | 3.85 | 0.0256 |
| Sylgard 184 0.8 mm | 0.762 | 0.9400 | 100 Hz | 3.75 | 0.0038 |
| 5% ITO 100 nm round particles | 0.762 | 0.9400 | 100 kHz | 3.67 | 0.0058 |
| Comparison Sample | 0.762 | 0.9400 | 1 MHz | 3.61 | 0.0155 |
| Sylgard 184 0.8 mm | 0.822 | 0.9100 | 100 Hz | 4.03 | 0.0007 |
| 20% ITO 100 nm round particles | 0.822 | 0.9100 | 100 kHz | 3.98 | 0.0031 |
| Comparison Sample | 0.822 | 0.9100 | 1 MHz | 3.96 | 0.0112 |
| Sylgard 184 0.8 mm | 0.822 | 0.9000 | 100 Hz | 4.39 | 0.0022 |
| 30% ITO 100 nm round particles | 0.822 | 0.9000 | 100 kHz | 4.35 | 0.0024 |
| Comparison Sample | 0.822 | 0.9000 | 1 MHz | 4.33 | 0.0061 |
| Sylgard 184 0.8 mm | 0.812 | 0.9000 | 100 Hz | 4.98 | 0.0029 |
| 40% ITO 100 nm round particles | 0.812 | 0.9000 | 100 kHz | 4.91 | 0.0027 |
| Comparison Sample | 0.812 | 0.9000 | 1 MHz | 4.89 | 0.0053 |
| Sylgard 184 0.8 mm | 0.828 | 0.9150 | 100 Hz | 2.78 | 0.0016 |
| 1% Ag 18 nm round particles | 0.828 | 0.9150 | 100 kHz | 2.80 | 0.0013 |
| Comparison Sample | 0.828 | 0.9150 | 1 MHz | 2.79 | 0.0017 |
| Sylgard 184 0.8 mm | 0.814 | 0.9150 | 100 Hz | 2.91 | 0.0048 |
| 2% Ag 18 nm round particles | 0.814 | 0.9150 | 100 kHz | 2.93 | 0.0014 |
| Comparison Sample | 0.814 | 0.9150 | 1 MHz | 2.92 | 0.0019 |

TABLE 2-continued

Sample compositions and Dielectric Test Results.

| Sample Description | Avg. Sample Thickness (mm) | Electrode Gap Reading (mm) | Frequency | Dielectric Constant | Dissipation Factor |
|---|---|---|---|---|---|
| Sylgard 184 0.8 mm | 0.816 | 0.8950 | 100 Hz | 2.85 | 0.0026 |
| 2.4% Ag 18 nm round particles | 0.816 | 0.8950 | 100 kHz | 2.87 | 0.0014 |
| Comparison Sample | 0.816 | 0.8950 | 1 MHz | 2.86 | 0.0020 |
| Sylgard 184 0.8 mm | 0.822 | 0.9050 | 100 Hz | 2.83 | 0.0026 |
| 2.8% Ag 18 nm round particles | 0.822 | 0.9050 | 100 kHz | 2.84 | 0.0014 |
| Comparison Sample | 0.822 | 0.9050 | 1 MHz | 2.83 | 0.0019 |
| Sylgard 184 0.8 mm | 0.826 | 0.9050 | 100 Hz | 2.88 | 0.0049 |
| 3.8% Ag 18 nm round particles | 0.826 | 0.9050 | 100 kHz | 2.84 | 0.0016 |
| Comparison Sample | 0.826 | 0.9050 | 1 MHz | 2.83 | 0.0021 |
| Sylgard 184 0.8 mm | 0.824 | 0.9050 | 100 Hz | 2.90 | 0.0035 |
| 5% Ag 18 nm round particles | 0.824 | 0.9050 | 100 kHz | 2.90 | 0.0018 |
| Comparison Sample | 0.824 | 0.9050 | 1 MHz | 2.89 | 0.0024 |
| Sylgard 184 0.8 mm | 0.816 | 0.9000 | 100 Hz | 3.28 | 0.0016 |
| 1% Pyrograf III | 0.816 | 0.9000 | 100 kHz | 3.25 | 0.0015 |
| Comparison Sample | 0.816 | 0.9000 | 1 MHz | 3.24 | 0.0023 |
| Sylgard 184 0.8 mm | 0.818 | 0.9000 | 100 Hz | 10.10 | 0.0675 |
| 1.78% Pyrograf III | 0.818 | 0.9000 | 100 kHz | 7.43 | 0.0747 |
| Comparison Sample | 0.818 | 0.9000 | 1 MHz | 6.51 | 0.1059 |
| Sylgard 184 0.8 mm | 0.836 | 0.9200 | 100 Hz | 3.42 | 0.0020 |
| 1% CNT 4% $TiO_2$ | 0.836 | 0.9200 | 100 kHz | 3.40 | 0.0015 |
|  | 0.836 | 0.9200 | 1 MHz | 3.39 | 0.0019 |
| Sylgard 184 0.8 mm | 0.842 | 0.9250 | 100 Hz | 4.52 | 0.0031 |
| 2% CNT 8% $TiO_2$ | 0.842 | 0.9250 | 100 kHz | 4.49 | 0.0019 |
|  | 0.842 | 0.9250 | 1 MHz | 4.47 | 0.0023 |
| Sylgard 184 0.8 mm | 0.830 | 0.9100 | 100 Hz | 6.02 | 0.0047 |
| 3% CNT 12% $TiO_2$ | 0.830 | 0.9100 | 100 kHz | 5.88 | 0.0032 |
|  | 0.830 | 0.9100 | 1 MHz | 5.85 | 0.0044 |
| Sylgard 184 0.8 mm | 0.826 | 0.9050 | 100 Hz | 6.22 | 0.0044 |
| 3.9% CNT ~16% $TiO_2$ | 0.826 | 0.9050 | 100 kHz | 6.06 | 0.0035 |
|  | 0.826 | 0.9050 | 1 MHz | 6.05 | 0.0044 |
| Sylgard 184 0.8 mm | 0.838 | 0.9200 | 100 Hz | 7.74 | 0.0067 |
| 4.45% CNT ~17.8% $TiO_2$ | 0.838 | 0.9200 | 100 kHz | 7.48 | 0.0060 |
|  | 0.838 | 0.9200 | 1 MHz | 7.41 | 0.0078 |
| Sylgard 184 0.8 mm | 0.836 | 0.9200 | 100 Hz | 8.44 | 0.0080 |
| 5% CNT ~20% $TiO_2$ | 0.836 | 0.9200 | 100 kHz | 8.10 | 0.0080 |
|  | 0.836 | 0.9200 | 1 MHz | 8.00 | 0.0106 |
| Sylgard 184 0.8 mm | 0.844 | 0.9250 | 100 Hz | 9.16 | 0.0085 |
| 6% CNT ~24% $TiO_2$ | 0.844 | 0.9250 | 100 kHz | 8.78 | 0.0087 |
|  | 0.844 | 0.9250 | 1 MHz | 8.66 | 0.0112 |
| Sylgard 184 0.8 mm | 0.842 | 0.9250 | 100 Hz | 10.22 | 0.0109 |
| 7% CNT ~28% $TiO_2$ | 0.842 | 0.9250 | 100 kHz | 9.68 | 0.0122 |
|  | 0.842 | 0.9250 | 1 MHz | 9.50 | 0.0158 |
| Sylgard 184 0.8 mm | 0.838 | 0.9200 | 100 Hz | 7.74 | 0.0067 |
| 4.45% CNT ~17.8% $TiO_2$ | 0.838 | 0.9200 | 100 kHz | 7.48 | 0.0060 |
|  | 0.838 | 0.9200 | 1 MHz | 7.41 | 0.0078 |
| Sylgard 184 1 mm | 0.971 | 1.0700 | 100 Hz | 2.74 | 0.0028 |
| Baseline Sample | 0.971 | 1.0700 | 100 kHz | 2.73 | 0.0014 |
|  | 0.971 | 1.0700 | 1 MHz | 2.73 | 0.0014 |
| Sylgard 184 0.8 mm | 0.816 | 0.9000 | 100 Hz | 3.28 | 0.0016 |
| 1% Pyrograf III | 0.816 | 0.9000 | 100 kHz | 3.25 | 0.0015 |
| Comparison Sample | 0.816 | 0.9000 | 1 MHz | 3.24 | 0.0023 |
| Sylgard 184 0.8 mm | 0.818 | 0.9000 | 100 Hz | 10.10 | 0.0675 |
| 1.78% Pyrograf III | 0.818 | 0.9000 | 100 kHz | 7.43 | 0.0747 |
| Comparison Sample | 0.818 | 0.9000 | 1 MHz | 6.51 | 0.1059 |
| Sylgard 184 0.8 mm | 0.824 | 0.9000 | 100 Hz | 5.40 | 0.0124 |
| 5.5% Oxidized Pyrograf III/ | 0.824 | 0.9000 | 100 kHz | 5.06 | 0.0075 |
| 13.3% $BaTiO_3$ | 0.824 | 0.9000 | 1 MHz | 5.01 | 0.0076 |
| Sylgard 184 0.8 mm | 0.872 | 0.9250 | 100 Hz | 4.80 | 0.0214 |
| 5.7% Oxidized Pyrograf III/ | 0.872 | 0.9250 | 100 kHz | 4.62 | 0.0078 |
| 13.2% Colloidal Silica | 0.872 | 0.9250 | 1 MHz | 4.56 | 0.0100 |
|  | 0.872 | 0.9250 | 5 MHz | 4.51 | 0.0134 |
|  | 0.872 | 0.9250 | 20 MHz | 4.55 | 0.0151 |
| Sylgard 184 0.8 mm | 0.880 | 0.9250 | 100 Hz | 5.35 | 0.0113 |
| 3.8% Un-oxidized Pyrograf III/ | 0.880 | 0.9250 | 100 kHz | 5.26 | 0.0029 |
| 15.1% Colloidal Silica | 0.880 | 0.9250 | 1 MHz | 5.23 | 0.0050 |
|  | 0.880 | 0.9250 | 5 MHz | 5.21 | 0.0085 |
|  | 0.880 | 0.9250 | 20 MHz | 5.29 | 0.0154 |

In this invention, it is surprisingly discovered that nanoparticles nonconductive in nature, when adsorbed onto the surface of the conductive fibers, can very effectively mitigate the tendency of the composite to become conductive. Furthermore, this approach can allow for a surprisingly high amount of conductive fiber to be incorporated to increase dielectric constant effectively, while still maintaining low dielectric loss.

More broadly, there has been a long standing problem in attempts to make use of the increasingly available nanofibers of a variety of compositions, but a common challenge is in dispersing them uniformly into a polymer matrix, as common nanofiber production techniques result in tightly bundled fibers. It is surprisingly discovered that this inventive method allow for easy dispersion of tightly buddle nanofibers into polymer matrix uniformly.

The invention claimed is:
1. A composition comprising:
 a) electrically conductive fibers comprising carbon, or a conductive oxide, and having an average diameter from 1 to 20,000 nm and an average length at least five times the average diameter;
 b) electrically nonconductive particles with an average diameter from 1 to 20,000 nm; and
 c) a polysiloxane polymer matrix surrounding said electrically conductive fibers and said electrically nonconductive particles;
wherein the electrically nonconductive particles are absorbed on the electrically conductive fibers.
2. The composition of claim 1 in which said electrically conductive fibers have an average diameter from 3 nm to 1,000 nm and have an electrical conductivity from 10 to $1\times10^8$ S/m.
3. The composition of claim 1 in which said electrically nonconductive particles have an average diameter from 5 nm to 1,000 nm and have an electrical conductivity no greater than 0.1 S/m.

* * * * *